United States Patent Office 3,069,287
Patented Dec. 18, 1962

3,069,287
COATING POLYCARBONATE PLASTICS
George A. Hudson, New Martinsville, W. Va., assignor to Mobay Chemical Company, Pittsburgh, Pa., a corporation of Delaware
No Drawing. Filed Feb. 16, 1961, Ser. No. 89,650
10 Claims. (Cl. 117—47)

This invention relates to a method for coating polycarbonate plastics and to the articles produced by the method. More particularly this invention relates to polycarbonate plastics coated with polyurethane plastics and to the method of accomplishing the same.

It is known that polycarbonate plastics such as, for example, those prepared by the process described in Canadian Patents 578,585 and 578,795 possess outstanding properties with respect to heat distortion and impact resistance. In fact polycarbonate plastics have the highest impact resistance of any unmodified plastic material known at this time. For these reasons, polycarbonate plastics have been used as substitutes for metals in many cases where other plastics would not possess sufficient properties to compete readily with metals in the different markets. Polycarbonates have also been known as substitutes for glass in many cases such as in sight glasses in storage tanks for different chemicals and the like. These applications of polycarbonate plastics are successful within limited degrees. The parts fabricated from polycarbonate plastics could not compete in many places with glass and metal for the reason that the abrasion resistance, resistance to known chemical solvents and resistance to common atmospheric conditions are not as good as the material being replaced.

It has been attempted to coat polycarbonate plastics with other materials to improve the abrasion, solvent and weather resistance. However, these attempts resulted in failure for the reason that adhesion of the different coating materials to the polycarbonate plastic surface is very poor, thus resulting in the coating easily pulling away from the base polycarbonate.

It is, therefore, an object of this invention to provide a method of rendering polycarbonate plastics susceptible to being coated. It is another object of this invention to provide a method for coating polycarbonate plastics with polyurethane plastics. It is still another object of this invention to provide a polyurethane-coated polycarbonate article. It is a further object of this invention to improve the abrasion, solvent and weather resistance of polycarbonate plastics. It is a still further object of this invention to provide a tightly adherent polyurethane coating on polycarbonate plastic articles.

The foregoing objects and others which will become apparent from the following description are accomplished in accordance with the invention, generally speaking, by providing a polycarbonate plastic article coated with a polyurethane plastic by a process which includes the steps of exposing the polycarbonate plastic article to a solution of an alkali metal dichromate in sulfuric acid and then coating the article with a polyurethane plastic. Thus the invention contemplates immersing a polycarbonate article in a sulfuric acid solution of an alkali metal dichromate, and rinsing the article, drying and coating with a polyurethane coating composition.

The alkali metal dichromate solution may be either potassium or sodium dichromate. Originally the solution used was that normally used in cleaning laboratory glassware. This solution is obtained by saturating concentrated sulfuric acid with alkali metal dichromate. The strength of the solution does not determine the ability to improve the adhesion to the polycarbonate plastic article. It has been found that even spent solutions which have lost much of the oxidizing power are effective in improving the adhesion of polyurethane coatings on polycarbonate plastics. A spent solution is one which is characterized by by-products such as chromium and potassium sulfate. Although the exact mechanism by which the dichromate solution renders the polycarbonate plastic susceptible to being coated with polyurethanes is not understood, it is believed that perhaps a combination of an oxidation effect and a coating effect takes place on the polycarbonate plastic. That is, where the dichromate solution still possesses oxidizing power, a portion of the polycarbonate surface is oxidized, thus enhancing the adhesive nature by producing either polar groups or isocyanate-reactive groups. Where a spent solution, that is a solution which has lost most of its oxidizing power is used, it is believed that perhaps a chromic sulfate layer is deposited on the polycarbonate layer which renders the plastic more amenable to coating than would be the unmodified polycarbonate plastic. Of these two mechanisms the latter seems the more probable as other known oxidizing agents exhibit no improved effect on the adhesive qualities of the urethane coated polycarbonates. It is not, however, intended to be limited to this theory.

Any polycarbonate plastic may be coated by the process of this invention. Especially suitable polycarbonates are those prepared from di-(monohydroxyaryl)-alkanes. Even more particularly suitable are those prepared from di-(monohydroxyaryl)-methanes and preferably 4,4'-dihydroxydiaryl-methanes. The polycarbonates may be prepared by reacting the dihydroxyaryl compounds with derivatives of carbonic acid such as carbonic acid diesters, phosgene, and bis-chloro carbonic acid esters of di-(monohydroxyaryl)-alkanes.

Any suitable di-(monohydroxyaryl)-alkane may be used such as, for example, (4,4'-dihydroxy-diphenyl)-methane, 2,2-(4,4'-dihydroxy-diphenyl)-propane, 1,1-(4,4'-dihydroxy-diphenyl)-cyclohexane, 1,1-(4,4'-dihydroxy-3,3'-dimethyl-diphenyl) cyclohexane, 1,1-(2,2'-dihydroxy-4,4'-dimethyl-diphenyl)-butane, 2,2-(2,2'-dihydroxy-4,4'-di-tert. butyl-diphenyl)-propane, 1,1-(4,4'-dihydroxy-diphenyl)-1-phenylethane, 2,2-(4,4'-dihydroxy-diphenyl)-butane, 2,2-(4,4'-dihydroxy-diphenyl)-pentane, 3,3-(4,4'-dihydroxy-diphenyl)-pentane, 2,2-(4,4'-dihydroxy-diphenyl)-hexane, 3,3'-(4,4'-dihydroxy-diphenyl)-hexane, 2,2-(4,4'-dihydroxy-diphenyl)-4-methyl-pentane, 2,2-(4,4'-dihydroxy-diphenyl) heptane, 4,4-(4,4'-dihydroxy-diphenyl)-heptane, 2,2-(4,4'-dihydroxy-diphenyl)-tridecane, 2,2-(4,4'-dihydroxy-3-methyl-diphenyl)-propane, 2,2-(4,4'-dihydroxy-3-methyl-3-ispropyldiphenyl)-butane, 2,2-(3,5,3',5'-tetra-chloro-4,4'-dihydroxy-diphenyl)-propane, 2,2-(3,5,3',5'-tetra-bromo-4,4'-dihydroxy-diphenyl)-propane, (3,3'-di-chloro-4,4'-dihydroxy-diphenyl)-methane, 2,2'-dihydroxy-5,5'-difluoro-diphenyl-methane, (4,4'-dihydroxy-diphenyl)-phenyl-methane and 1,1-(4,4'-dihydroxy-diphenyl)-1-phenyl-ethane and the like. The polycarbonate plastics may be prepared by the process and with any of the reaction components set forth in Canadian Patents 578,585, 578,795 and 594,805.

Any suitable polyurethane coating composition may be used to coat the polycarbonate plastic in accordance with the method of this invention. Polyurethane coating compositions generally are prepared by reacting an organic compound containing active hydrogen containing groups in the molecule with an organic polyisocyanate. Generally, the coating composition should have a curing temperature less than the heat distortion point of the polycarbonate plastic. Any suitable organic compound containing active hydrogen containing groups may be used such as, for example, polyhydric alcohols, polyamines, hydroxyl polyesters, polyhydric polyalkylene ethers, polyhydric polythioethers, polyesteramides, and polyacetals.

Any suitable polyhydric alcohol may be used such as, for example, ethylene glycol, propylene glycol, butylene glycol, amylene glycol, xylylene glycol, hexanetriol, glycerine, trimethylol ethane, trimethylol propane, pentaerythritol and the like. Any suitable polyamine may be used such as, for example, ethylene diamine, propylene diamine, butylene diamine, amylene diamine, hexanetriamine, xylylene diamine and the like.

Any suitable hydroxyl polyester may be used such as, for example, the reacton product of a polycarboxylic acid and a polyhydric alcohol. Any suitable polycarboxylic acid may be used in the prepaartion of a polyester such as, for example, adipic acid, succinic acid, suberic acid, sebacic acid, oxalic acid, methyladipic acid, glutaric acid, pimelic acid, azelaic acid, phthalic acid, terephthalic acid, isophthalic acid, 1,2,4-benzene tricarboxylic acid, thiodiglycollic acid, thiodipropionic acid, maleic acid, fumaric acid, citraconic acid, itaconic acid and the like. Any suitable polyhydric alcohol may be used in the reaction with the polycarboxylic acid to form a polyester such as, for example, ethylene glycol, diethylene glycol, propylene glycol, butylene glycol, hexane diol, hexane triol, glycerine, bis-(hydroxy-methyl-cyclohexane), trimethylol propane, pentaerythritol and the like.

Any suitable polyhydric poly(alkylene ether) may be used such as, for example, the condensation product of an alkylene oxide with a small amount of a compound containing active hydrogen containing groups such as, for example, water, ethylene glycol, propylene glycol, butylene glycol, amylene glycol, trimethylol propane, glycerine, pentaerythritol, hexanetriol and the like. Any suitable alkylene oxide condensate may also be used such as, for example, the condensates of ethylene oxide, propylene oxide, butylene oxide, amylene oxide and mixtures thereof. The polyalkylene ethers prepared from tetrahydrofuran may be used. The polyhydric polyalkylene ethers may be prepared by any known process such as, for example, the process described by Wurtz in 1859 and in the "Encyclopedia of Chemical Technology," volume 1, pages 257 to 262, published by Interscience Publishers in 1951, or in U.S. Patent 1,922,459.

Any suitable polyhydric polythioether may be used such as, for example, the reaction product of one of the aforementioned alkylene oxides used in the preparation of the polyhydric polyalkylene ether with a polyhydric thioether such as, for example, thiodiglycol, 3,3'-dihydroxy propylsulfide, 4,4'-dihydroxy butylsulfide, 1,4-(β-hydroxy ethyl) phenylene dithioether and the like.

Any suitable polyacetal may be used such as, for example, the reaction product of an aldehyde with a polyhydric alcohol. Any suitable aldehyde may be used such as, for example, formaldehyde, paraldehyde, butyraldehyde and the like. Any of the polyhydric alcohols mentioned above with relation to the preparation of hydroxyl polyesters may be used.

It is preferred that the organic compound containing active hydrogen used in the preparation of the polyurethane coating composition have a molecular weight of at least about 600 and most preferably from about 600 to about 3000 and an hydroxyl number of from about 100 to about 400. The compositions should also be prepared from quantities of reactants such that the —NCO to —OH ratio is from about 0.8 to about 2.0 and preferably about 1.

Compounds containing active hydrogen containing groups suitable for use in the preparation of polyurethane coating compositions are "Multron" R–12 and R–14 marketed by Mobay Chemical Company, "Niax" LHT-240 marketed by Union Carbide Corporation, TP-740 marketed by Wyandotte Chemicals Corporation, OX-50 marketed by Spencer Kellogg and Sons, Incorporated and "Polycin" 54 marketed by Baker Castor Oil Company.

Any suitable organic polyisocyanate may be utilized in the process of this invention such as, for example, aliphatic polyisocyanates, aromatic polyisocyanates, alicyclic polyisocyanates and heterocyclic polyisocyanates, including such as, for example, ethylene diisocyanate, ethylidene diisocyanate, propylene diisocyanate, butylene diisocyanate, cyclopentylene-1,3-diisocyanate, cyclohexylene-1,4-diisocyanate, cyclohexylene-1,2-diisocyanate, 2,4-tolylene diisocyanate, 2,6-tolylene diisocyanate, 4,4'-diphenylmethane diisocyanate, 2,2-diphenylpropane-4,4'-diisocyanate, p-phenylene diisocyanate, m-phenylene diisocyanate, xylylene diisocyanate, 1,4-naphthylene diisocyanate, 1,5-naphthylene diisocyanate, diphenyl-4,4'-diisocyanate, azobenzene-4,4'-diisocyanate, diphenylsulfone - 4,4' - diisocyanate, dichlorohexamethylene diisocyanate, tetramethylene diisocyanate, pentamethylene diisocyanate, hexamethylene diisocyanate, furfurylidene diisocyanate, 1-chlorobenzene-2,4-diisocyanate, 4,4',4''-triisocyanato triphenyl methane, 1,3,5-triisocyanato benzene, 2,4,6 - triisocyanate toluene, 4,4' - dimethyl diphenyl methane-2,2',5,5'-tetraisocyanate and the like.

Of the monomeric polyisocyanates, the isomers of tolylene diisocyanate, that is 2,4-tolylene diisocyanate, 2,6-tolylene diisocyanate and mixtures thereof are preferred. It is also preferred to utilize as the polyisocyanate the reaction product of three mols of a monomeric diisocyanate such as tolylene diisocyanate with one mol of a polyhydroxyl compound such as trimethylol propane. This yields a trifunctional isocyanate.

In some instances, it is desirable to use a low molecular weight chain-extending or cross-linking agent in combination with the organic compound containing active hydrogen containing groups and the polyisocyanates. Any suitable cross-linking agent may be used such as, for example, 1,3 - butanediol, 1,4 - butanediol, decanediol, hexanediol, thiodiglycol, 1,4-phenylene-(bis hydroxy ethyl ether), ethylene glycol, propylene glycol, bis(hydroxymethyl-cyclohexane), trimethylol propane, pentaerythritol, ethylene diamine, propylene diamine, hexamethylene diamine, cyclohexylene diamine, phenylene diamine, tolylene diamine, 3,3'-dichlorobenzidine, 3,3'-dinitrobenzidine, hydrazine, triaminobenzene, aminoethyl alcohol, amino propyl alcohol, amino butyl alcohol and the like.

In the coating of the polycarbonate plastics which have been previously treated with the dichromate solution to render them susceptible to being coated, the polyurethanes prepared from hydroxyl polyesters and polyhydric polyalkylene ethers are preferred. In one preferred coating system an isocyanate-terminated prepolymer, which is prepared by reacting either an hydroxyl polyester or a polyhydric polyalkylene ether with an excess of a polyisocyanate, is mixed with a tertiary amine catalyst and a cross-linker in an inert solvent and then applied to the polycarbonate plastic. Any suitable tertiary amine catalyst may be used such as, for example, methyl diethanol amine, dimethyl cyclohexyl amine, dimethyl hexahydroaniline, N-methyl morpholine, pyridine, methyl piperidine, dimethyl piperazine, tribenzylamine, tetramethyldiaminodipropylether and the like.

The reaction may be carried out without the presence of catalysts. However, they are desired to enhance the cure rate. The cross-linking agent and tertiary amine may be combined as a tetrafunctional hydroxyl bearing tertiary amine such as, for example, N,N,N',N'-tetrakis (2-hydroxypropyl) ethylene diamine. It should also be noted that castor oil may be advantageously used as the polyester in such a system and in any of the systems forming suitable coating compositions.

The most preferred polyurethane system, however, is that formed by reacting a prepolymer with an hydroxyl polyester or a polyhydric polyalkylene ether. The prepolymer, which may be prepared by first reacting a diisocyanate with a trifunctional alcohol, is added to either the polyester or polyether in a solvent solution. This last mentioned system is the most advantageous for it permits the addition of pigments to the coating solution as the pigments may be first added to either the polyether or polyester and then the prepolymer containing terminal —NCO groups added thereto.

In the preparation of polycarbonate coated materials by the process described herein the polycarbonate article is first subjected to the treatment with the dichromate sulfuric acid solution for a period of time of about one minute. The sulfuric acid solution is then rinsed from the article and the article is dried. The polyurethane coating solution is then applied to the polycarbonate article by any of the known procedures in the art such as, for example, brushing, spraying, dipping, doctoring, rolling and the like. The application of the coating by spraying is the preferred method, however, to keep the possibility of solvent attack to a minimum. However, if subsequent polyurethane coatings are desired, any method of application is equally suitable as the problem of solvent resistance is no longer present.

The articles prepared in accordance with this invention find extensive use in any application of polycarbonate plastics where excessive abrasion, the action of solvents or exposure to the elements is encountered. Typical illustrations and uses of articles prepared in accordance with this invention are automobile bumpers, automobile grills, typewriter parts, sight glasses for storage tanks of all kinds including chemical tanks containing solvents for organic materials, safety helmets and machine parts of all kinds.

The invention will be further illustrated by the following examples in which the parts are by weight unless otherwise specified.

*Example 1*

In a solution of 20 parts of sodium hydroxide in 250 parts of water are suspended 57 parts of 2,2-(4,4'-dihydroxy-diphenyl)-propane. A clear solution is formed. After the addition of 22 parts of a mixture of xylene isomerides and 0.0026 part of phenol, 6 parts of phosgene are introduced into the solution at 30° C. with stirring and cooling. The mixture is then simultaneously treated with 31.5 parts of phosgene and 21 parts of sodium hydroxide in 62 parts of water in the course of 1½ hours. The mixture is subsequently stirred at 80° C. for 1 hour, the colorless granular product obtained is filtered off with suction and washed until neutral. The colorless product obtained melts at 225–227° C. into a highly viscous state. The granular product is then injection molded into a safety helmet.

*Example 2*

A safety helmet prepared in accordance with Example 1 is immersed for one minute in a solution prepared by mixing 500 ml. of a saturated solution of potassium dichromate with 800 ml. of concentrated sulfuric acid. The helmet is then removed from the solution, rinsed thoroughly with water and dried.

*Example 3*

A safety helmet treated in accordance with the procedure of Example 2 is coated by applying thereto a polyurethane coating composition prepared by mixing 440 parts of a polyisocyanate prepared by reacting an excess of tolylene diisocyanate with trimethylol propane with 440 parts of blown castor oil having an hydroxyl number of about 131 and diluting the resulting mixture to 50% solids with a solvent mixture of equal parts of Cellosolve acetate and xylol. The resulting polyurethane coated polycarbonate helmet demonstrates remarkable resistance to abrasion and solvents such as carbon tetrachloride, chloroform and other known solvents for polycarbonate plastics.

When a comparison test is made using a helmet prepared in accordance with Example 1 without first subjecting the sample to the treatment of a dichromate in accordance with this invention, the adhesion of the coating to the plastic is very poor and does not improve either the abrasion resistance or solvent resistance. The coating readily pulls away from the base material.

*Example 4*

A polyurethane coating composition is prepared by first reacting 320 parts of castor oil having an hydroxyl number of about 160 and an approximate equivalent weight of about 350 with 175 parts of a mixture of 80% 2,4-tolylene diisocyanate and 20% 2,6-tolylene diisocyanate in 450 parts of xylol to yield a solvent solution of a polyurethane prepolymer containing terminal —NCO groups. To about 100 parts of this solution are added about 6.4 parts of N,N,N',N'-tetrakis-(2-hydroxyl propyl)-ethylene diamine in about 6.4 parts of a solvent mixture of equal parts of Cellosolve acetate and xylol. This coating composition is applied to a safety helmet prepared in accordance with Example 2 by spraying and is permitted to dry. The coating tightly adheres to the base polycarbonate helmet and improves both the abrasion and solvent resistance.

A polycarbonate helmet not treated in accordance with Example 2 when coated with the composition above described does not demonstrate properties superior to uncoated polycarbonates because the coating is readily removed from the base polycarbonate helmet.

*Example 5*

A prepolymer is prepared by reacting about 23 parts of a polyhydric polyalkylene ether prepared by condensing about 174 parts (3 mols) of propylene oxide with about 67 parts (0.5 mol) of hexanetriol to an hydroxyl number of about 232 and a molecular weight of about 723 with about 17 parts of a mixture of 80% 2,4-tolylene diisocyanate and 20% 2,6-tolylene diisocyanate. This reaction product is then dissolved in a mixture of 20 parts of Cellosolve acetate and 40 parts of xylol. The prepolymer prepared is applied by brushing in a thin film onto a polycarbonate safety helmet prepared in accordance with Example 2. The coating is permitted to cure in moist air at a temperature of about 90° C. for about 3 hours. The resulting polyurethane coated polycarbonate helmet exhibits high abrasion and solvent resistance without any apparent failure of the adhesion between the polycarbonate and the polyurethane.

A similar coating when applied to a polycarbonate helmet not treated in accordance with Example 2 readily pulls away from the polycarbonate because of the very weak adhesive bond formed therewith.

*Example 6*

To 100 parts of the prepolymer prepared in Example 5 are added about 6.4 parts of N,N,N'N'-tetrakis-(2-hydroxy-propyl)-ethylene diamine and about 200 parts of a solvent mixture of Cellosolve acetate and xylol. This coating composition is applied to a polycarbonate helmet treated in accordance with Example 2 and is permitted to air dry. The resulting coating tightly adheres to the polycarbonate test sample and greatly improves the abrasion and solvent resistance of the helmet.

In comparison, the same coating when applied to a polycarbonate test helmet not treated as in Example 2, forms a very loose bond and is easily removed from the sample.

*Example 7*

A polyurethane coating composition is prepared by admixing (1) about 100 parts of a polyester prepared by reacting 3 mols of adipic acid, 3 mols of 1,3-butanediol and 1 mol of 1,2,6-hexanetriol, (2) about 23.0 parts of an organic polyisocyanate prepared by reacting 3 mols of tolylene diisocyanate with 1 mol of trimethylol propane and dissolving the reaction product in ethyl acetate to form a 75% solids solution and (3) about 43.5 parts of a solvent mixture of equal parts of Cellosolve acetate and xylol. The resulting composition is applied to a polyurethane safety helmet prepared in accordance with Example 2 and permitted to dry. The coating tightly adheres to the polycarbonate helmet and greatly improves both the abrasion and solvent resistance.

The adhesion of the same coating composition to a polycarbonate helmet not treated as in Example 2 is very poor and does not beneficially improve the polycarbonate plastic helmet.

*Example 8*

About 241 parts of a polyhydric polyalkylene ether prepared by condensing about 174 parts (3 mols) of propylene oxide with about 67 parts (0.5 mol) of hexanetriol to an hydroxyl number of about 232 and a molecular weight of about 723 is dissolved in about 416 parts of a solvent solution of equal parts of xylol and Cellosolve acetate. To this solution is added about 355 parts of a 75% solid solution in ethyl acetate of a polyisocyanate prepared by reacting 3 mols of tolylene diisocyanate with 1 mol of trimethylol propane. The resulting composition is applied to a polyurethane safety helmet prepared in accordance with Example 2 and permitted to dry. The coating tightly adheres to the polycarbonate helmet and greatly improves both the abrasion and solvent resistance.

The adhesion of the same coating composition to a polycarbonate helmet not treated in accordance with Example 2 is very poor and does not beneficially improve the polycarbonate plastic helmet.

The foregoing examples are for the purpose of illustration and not for the purpose of limiting the invention. It is to be understood that any of the polycarbonate plastics set forth above or any polyurethane coating composition may be utilized in the working examples in place of these set forth therein. It is also to be understood that sodium dichromate may be used in place of potassium dichromate for treating polycarbonate plastics to improve the adhesion of polyurethane coatings.

Although the invention has been described in considerable detail for the purpose of illustration, it is to be understood that variations may be made therein by those skilled in the art without departing from the spirit of the invention and the scope of the claims.

What is claimed is:

1. A method of rendering organic polycarbonate plastics susceptible to be coated which comprises exposing said organic polycarbonate plastic to a solution of an alkali metal dichromate in sulfuric acid.

2. The method of claim 1 wherein the alkali metal dichromate is sodium dichromate.

3. The method of claim 1 wherein the alkali metal dichromate is potassium dichromate.

4. A method of rendering organic polycarbonate plastics susceptible to be coated which comprises exposing said organic polycarbonate plastic to a solution of an alkali metal dichromate in sulfuric acid, rinsing said plastic and drying.

5. A method for coating organic polycarbonate plastics with a layer of polyurethane plastic which comprises exposing said organic polycarbonate plastic to a solution of an alkali metal dichromate in sulfuric acid, rinsing said solution from said organic polycarbonate, drying said organic polycarbonate and applying thereto a layer of polyurethane plastic.

6. A laminated article of manufacture which comprises a core element of an organic polycarbonate plastic and a tightly adherent coating of a polyurethane plastic and prepared by the process which comprises exposing said organic polycarbonate plastic to a solution of an alkali metal dichromate in sulfuric acid, rinsing said solution from said polycarbonate, drying said polycarbonate and applying thereto a layer of polyurethane plastic.

7. An article of manufacture which comprises a core element of a polycarbonate prepared by the process which comprises reacting a di-(monohydroxyaryl)-alkane with a member selected from the group consisting of carbonic acid diesters, phosgene and bis-chlorocarbonic acid esters of di-(monohydroxyaryl)-alkanes and a coating of a polyurethane plastic prepared by reacting an organic polyisocyanate with an organic compound containing active hydrogen containing groups and selected from the group consisting of hydroxyl polyesters prepared by the process which comprises reacting a polyhydric alcohol with a polycarboxylic acid and polyhydric polyalkylene ethers.

8. A method of coating polycarbonate plastics with a layer of polyurethane plastic which comprises exposing a core element of a polycarbonate plastic prepared by the process which comprises reacting a di-(monohydroxyaryl)-alkane with a member selected from the group consisting of carbonic acid diesters, phosgene and bis-chlorocarbonic acid esters of di-(monohydroxyaryl)-alkanes to an alkali metal dichromate in sulfuric acid, and applying to said core element a polyurethane plastic prepared by reacting an organic polyisocyanate with an organic compound containing active hydrogen containing groups and selected from the group consisting of hydroxyl polyesters prepared by the process which comprises reacting a polyhydric alcohol with a polycarboxylic acid and polyhydric polyalkylene ethers.

9. An organic polycarbonate plastic having a tightly adherent coating comprising a polyurethane plastic by the process which comprises exposing said organic polycarbonate plastic to a solution of an alkali metal dichromate in sulfuric acid, rinsing said solution from said polycarbonate, drying said polycarbonate and applying thereto a polyurethane plastic.

10. A safety helmet comprising a polycarbonate plastic shell having a coating of a polyurethane plastic tightly adhered thereto by the process which comprises exposing said organic polycarbonate plastic to a solution of an alkali metal dichromate in sulfuric acid, rinsing said solution from said polycarbonate, drying said polycarbonate and applying thereto a polyurethane plastic.

References Cited in the file of this patent

UNITED STATES PATENTS

| | | |
|---|---|---|
| 2,606,162 | Coffey et al. | Aug. 5, 1952 |
| 2,847,402 | Gluesenkamp et al. | Aug. 12, 1958 |
| 2,874,046 | Klockgether et al. | Feb. 17, 1959 |